(12) United States Patent
Perret

(10) Patent No.: US 12,445,084 B2
(45) Date of Patent: Oct. 14, 2025

(54) PHOTOVOLTAIC FACILITY AND METHOD

(71) Applicant: Planair SA, La Sagne (CH)

(72) Inventor: Lionel Perret, Neuchâtel (CH)

(73) Assignee: Planair SA, La Sagne (CH)

( * ) Notice: Subject to any disclaimer, the term of this patent is extended or adjusted under 35 U.S.C. 154(b) by 0 days.

(21) Appl. No.: 18/013,176

(22) PCT Filed: Jun. 22, 2021

(86) PCT No.: PCT/IB2021/055502
§ 371 (c)(1),
(2) Date: Dec. 27, 2022

(87) PCT Pub. No.: WO2021/260549
PCT Pub. Date: Dec. 30, 2021

(65) Prior Publication Data
US 2023/0246584 A1 Aug. 3, 2023

(30) Foreign Application Priority Data

Jun. 25, 2020 (CH) .................................. 00768/20

(51) Int. Cl.
*H02S 20/22* (2014.01)
*F03D 9/00* (2016.01)
(Continued)

(52) U.S. Cl.
CPC .............. *H02S 20/22* (2014.12); *F03D 9/007* (2013.01); *H02S 10/12* (2014.12); *F05B 2220/708* (2013.01); *H02S 30/20* (2014.12)

(58) Field of Classification Search
CPC .......... H02S 20/22; H02S 10/12; H02S 30/20; H02S 20/30; H02S 20/10; F03D 9/007;
(Continued)

(56) References Cited

U.S. PATENT DOCUMENTS

| 8,564,147 | B1 | 10/2013 | Sharp |
| 2010/0090605 | A1* | 4/2010 | Nevins ................... F03D 13/20 |
| | | | 315/159 |

(Continued)

FOREIGN PATENT DOCUMENTS

| CN | 104113271 A | 10/2014 |
| CN | 108809215 A | 11/2018 |

(Continued)

OTHER PUBLICATIONS

International Search Report & Written Opinion for PCT/IB2021/055502, dated Oct. 15, 2021, 8 pages.

(Continued)

*Primary Examiner* — Michael Y Sun
(74) *Attorney, Agent, or Firm* — Blank Rome LLP

(57) ABSTRACT

Photovoltaic installation comprising a vertical structure, a plurality of photovoltaic elements, every photovoltaic element comprising a cantilever beam carrying photovoltaic panels, the beam being affixed to the vertical structure, characterized in that the beams include blades of reused horizontal axis wind turbines or sections blades of reused horizontal axis wind turbines. The vertical structure is preferably a mast of a horizontal axis wind turbine in service.

10 Claims, 5 Drawing Sheets

(51) Int. Cl.
*H02S 10/12* (2014.01)
*H02S 30/20* (2014.01)

(58) Field of Classification Search
CPC ....... F05B 2220/708; F05B 2240/2211; Y02B 10/30; Y02E 10/50; Y02E 10/72
See application file for complete search history.

(56) References Cited

U.S. PATENT DOCUMENTS

| | | |
|---|---|---|
| 2011/0315192 A1 | 12/2011 | Swatek et al. |
| 2012/0063913 A1* | 3/2012 | Fugslang ............... F03D 1/0641 29/889.7 |
| 2017/0152837 A1 | 6/2017 | Anemaat et al. |
| 2017/0210468 A1 | 7/2017 | Jacob et al. |
| 2018/0155018 A1 | 6/2018 | Kovac et al. |
| 2018/0238305 A1* | 8/2018 | McMahon ............... F03D 9/007 |
| 2018/0294769 A1 | 10/2018 | Stoger et al. |
| 2020/0343852 A1* | 10/2020 | Chentnik ................ F21S 8/085 |

FOREIGN PATENT DOCUMENTS

| | | |
|---|---|---|
| CN | 110154274 A | 8/2019 |
| DE | 202009002259 U1 | 7/2009 |
| KR | 2014/0115558 A | 10/2014 |
| WO | WO-2008/088311 A2 | 7/2008 |
| WO | WO-2015/051926 A1 | 4/2015 |
| WO | WO-2018/137290 A1 | 8/2018 |
| WO | WO-2019/246148 A1 | 12/2019 |
| WO | WO-2020/038537 A1 | 2/2020 |
| WO | WO-2020/083450 A1 | 4/2020 |

OTHER PUBLICATIONS

M. Rani, et al., "A Review on Recycling and Reuse Methods for Carbon Fiber/Glass fiber Composites Waste from Wind Turbine Blades", Composites Part B 215; 2021; 15 pgs.

J. Joustra, et al., "Structural Reuse of High End Composite Products: A Design Case Study on Wind Turbine Blades", Resources, Conservation & Recycling; 167; 2021; 10 pgs.

J. H. Goodman, "Architecture Reuse of Wind Turbine Blades", SOLAR 2010 Conference, ASES, May 18-22, 2010, 8 pgs.

Larsen et al., "Recycling Wind", Reinforced Plastics, Elsevier Advanced Technology, vol. 53, No. 1, Jan. 1, 2009, 6 pgs.

* cited by examiner

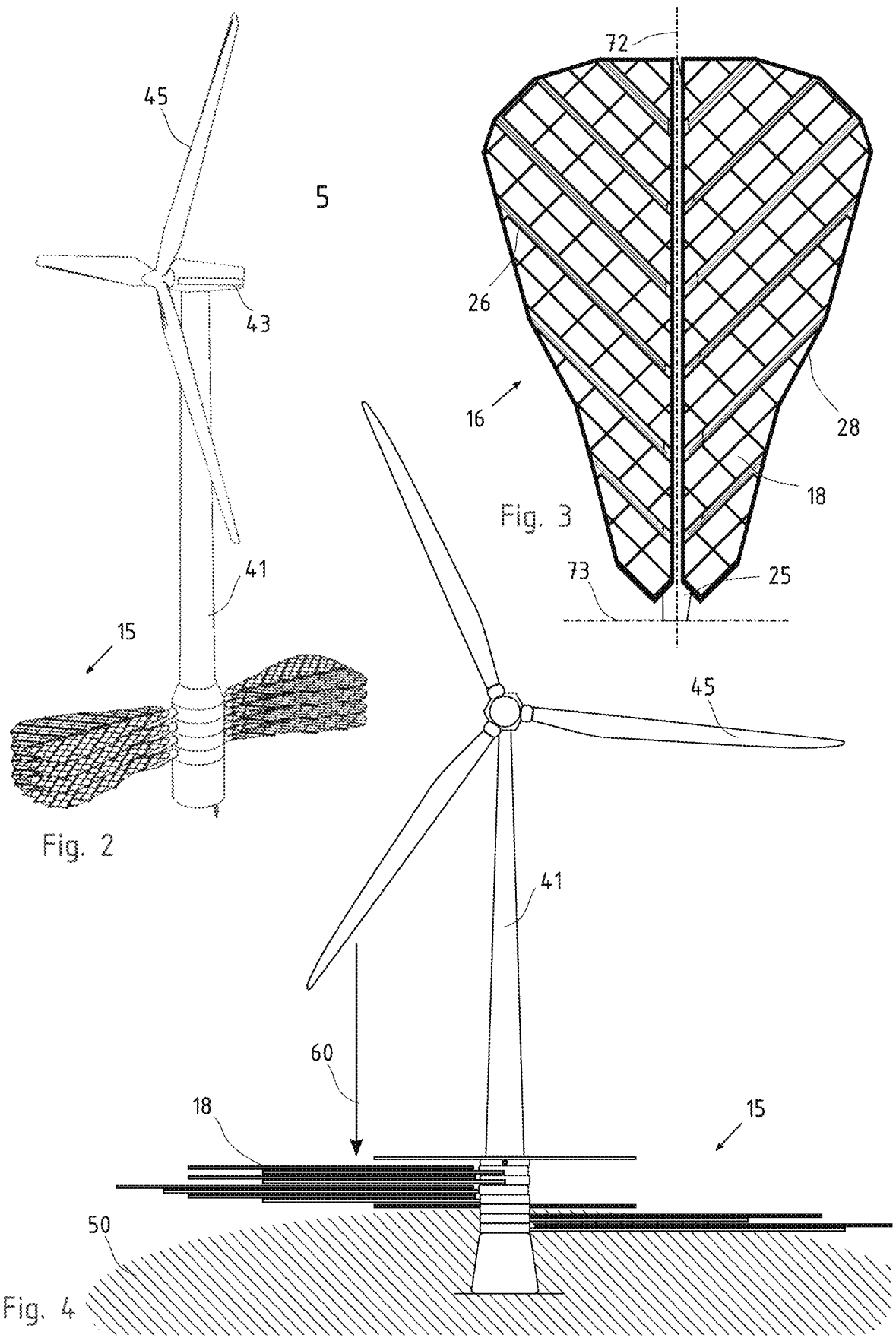

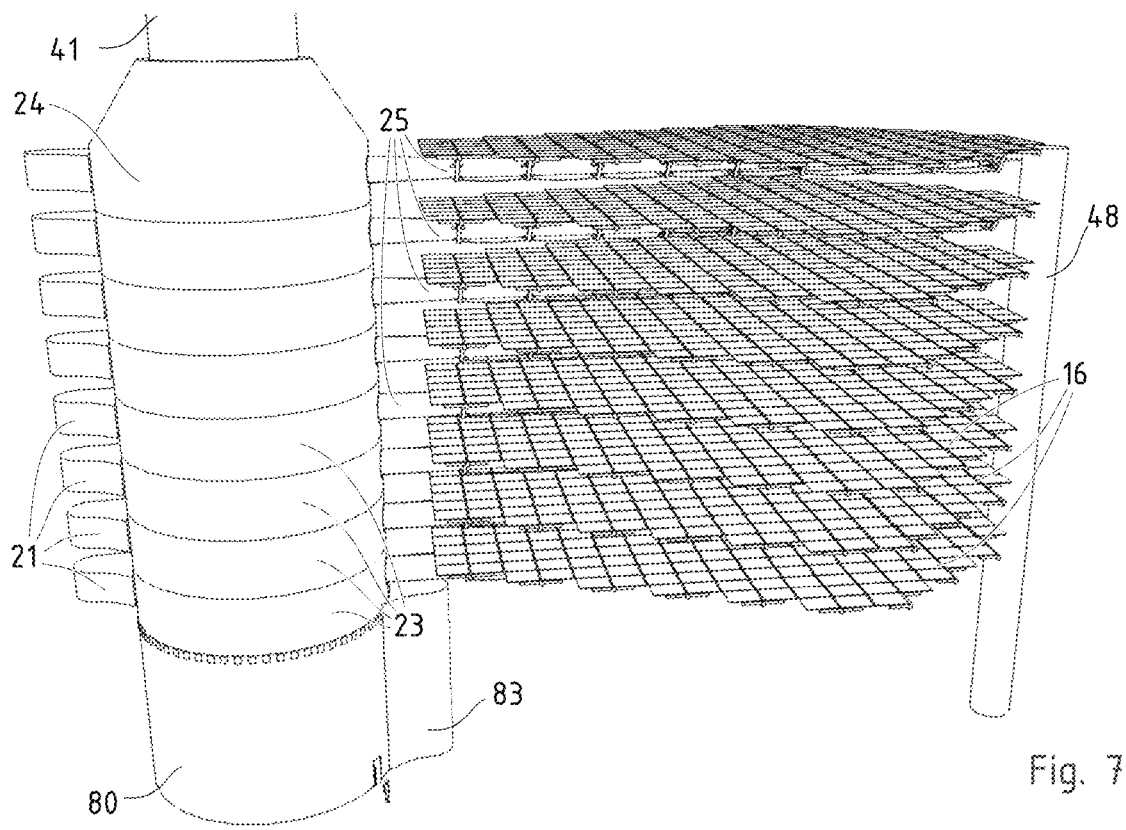
Fig. 7
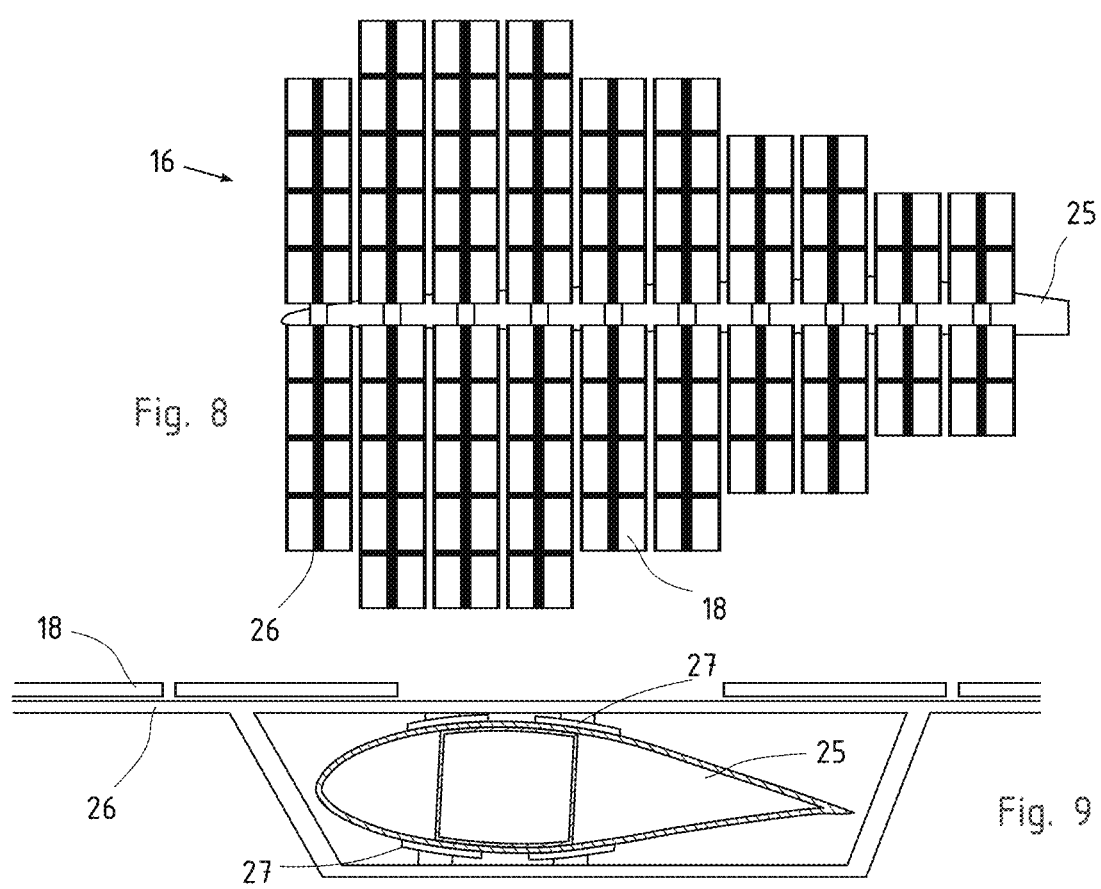
Fig. 8
Fig. 9

PHOTOVOLTAIC FACILITY AND METHOD

REFERENCE DATA

The present application is a national phase of international patent application PCT/IB2021/055502 of Jun. 22, 2021, claiming priority of Swiss patent application CH00768/20 of Jun. 25, 2020, the contents whereof are hereby incorporated in their entirety.

TECHNICAL DOMAIN

The present invention relates to a modular system that allows the conception, the fabrication, the modification, the installation, the maintenance simplified of photovoltaic systems, particularly, but not exclusively, in proximity of wind turbines.

STATE OF THE ART

Photovoltaic installations have already a significant role and their number is ever increasing thanks, among other reasons, to the reasonable price of silicon photovoltaic panels. Solar installations are however still visually imposing and occupy vast surfaces. Beyond roofs, it is difficult to find locations that can accept new installations.

Installations transforming the wind's kinetic energy into electricity are also known. The most common nowadays are the horizontal axis wind turbine that have, in general, a nacelle atop of a mast. The nacelle is capable of yawing according to the instantaneous wind direction and carries a turbine that is driven in rotation by the wind about a horizontal axis. These structures can grow to considerable heights, and the blades of the most powerful turbine have now a length of 80 metres and more.

Hybrid sites producing renewable energy are known, for example by WO 20083450 A1 and WO 20038537 A1, combining one or several wind turbines configures to transform the kinetic energy of wind into electric energy, and photovoltaic panels harvesting the energy of solar rays. The installation sites of wind turbines often have abundant sunshine, they have a connection to the power grid, solid foundations capable of withstanding extreme conditions, and access routes. Moreover, solar panels can alleviate, at least in part, the aleatory nature of wind energy, due to the inconstance of the winds.

The need for extra space and the limitation of access to the wind turbines for maintenance are however limiting factor against the diffusion of such hybrid sites.

The processing of turbine blades at the end of their technical life is a theme of global importance. Blades are often dismantled to install new blades with better performances. Most of them are constituted of composites of thermoset resins and fibres of glass, aramid or carbon, which are not recyclable by conventional means. The blades are usually processed as waste at the end of their technical life. They are incinerated, with emission of pollutants and microparticles. Sometimes, lacking an economical process to break or crush them, they are simply buried in discharge sites. Old wind turbine blades have a considerable cost, as they are the only non-recyclable component of wind farms.

Photovoltaic installations in isolated places or in the mountains have special requirements. For example, they must support the rigour of climate and abundant snow layers.

There is therefore a need of a solar product that enables efficient and economical solar installations.

SHORT SUMMARY OF THE INVENTION

A goal of the invention, among others, is to propose a photovoltaic system overcoming the above-mentioned limitations.

Another goal of the invention is to propose a reuse of wind-turbine blades at the end of their technical life to avoid that they become waste. This goal can be combined with other goals or be independent.

According to the invention, such goals are achieved through the object of the attached claims, and in particular by a photovoltaic installation comprising a vertical structure, a plurality of photovoltaic elements, every photovoltaic element comprising at least a cantilever beam carried by the vertical structure and a plurality of photovoltaic panels, characterized in that the beams include blades of horizontal-axis wind turbines or sections of blades of horizontal-axis wind turbines. The structure is open from below, and the photovoltaic panel are preferably bifacial, to collect diffused light.

The invention can have several additional features that are advantageous, without being essential. For example, the vertical structure can be a mast of a horizontal axis wind turbine in function, or a stump of an axis of a turbine that is no more in service, or a shell surrounding a turbine mast. The photovoltaic modules could be mounted on a plurality of superposed collars that girdle the vertical structure. The collars, turning around a vertical axis can position the modules obtaining, according to the meteorological conditions, an open configuration with the modules regularly spaced to optimize light collection, or a folded configuration in which the modules are superposed and aligned with the wind direction to resist to unfavourable meteorological conditions.

When the photovoltaic installation of the invention is combined with a wind turbine in service, the production of solar energy can complement the generation from the wind when the force of the latter is moderate. By strong winds, the electric line connecting the turbine is fully used by the wind-generated current and the solar panels can be folded without losses.

Moreover, the invention can have a secondary post that support the photovoltaic installation in the folded configuration. In a variant, this secondary post is a vertical mast placed downwind of the main mast of the wind turbine according to the dominant wind direction. It supports a fixed photovoltaic module, an end of the beam resting on the secondary post and another end of the beam held by a fixed, non-pivotable, collar girdling the vertical structure. In the folded configuration, all the photovoltaic modules are overlapped below the fixed photovoltaic module.

Articulated systems to incline the beams relative to the horizontal pivoting about a horizontal axis can be foreseen as well.

The panels can be installed on the beam in many ways: a plurality of horizontal crosspieces can be placed on the beam, for example at straight angle at their centres, and each crosspiece can carry a double row of photovoltaic panels. Advantageously, this arrangement can tolerate the flex of the beam. Crosspieces can connect to the beam by clamping means, for example.

The invention lies also in a method of building a photovoltaic installation comprising step of providing a plurality of blades of horizontal axis wind turbines or sections thereof to form beams: assemble a plurality of photovoltaic elements, each comprising a set of photovoltaic panels on a beam or on more than one beams; link an end of the beams to a vertical structure to carry the photovoltaic module in a cantilever fashion.

Dependent claims show important features of the invention that are nevertheless not essential, among which are: the disposition in a plane of the photovoltaic panels of each photovoltaic element, possibly on a horizontal plane; the ability of pivoting the beams about the axis of the vertical structure and/or to incline them relative to the horizontal by pivoting about an horizontal axis; the photovoltaic elements mounted on a plurality of collars pivotable about the axis of the vertical structure; the use of bifacial photovoltaic panels.

When it is specified that the photovoltaic modules are "flat" or lie in a plane, it should not be understood that the modules are comprised in an ideal geometric plane but rather that their arrangement is essentially planar, allowing the unavoidable deformation caused by material's flexibility. The blades of horizontal axis wind turbine resist to high static and dynamic load and can carry a vast surface of photovoltaic panels. When loaded, they may sag by a metre or more. Considering their great dimensions, such deformations remain modest.

In relation to the prior art, the invention has several advantages: deployment of a considerable photovoltaic surface on each wind turbine equipped of the invention, at a small material cost, reusing turbine blades that normally represent a liability. It can be estimated that the invention can provide 1-3 GWh per equipped turbine. The invention is compatible with existing installation and does not require important modifications to the wind turbines, uses the electric infrastructure that is already available and the foundation basement of the wind turbine as support.

Moreover, the invention brings a concentration of the impact of resources improving the energy return on investment (EROI) and land surface use, while providing considerable collateral advantages for wildlife, agriculture, noise control, and reduces risks linked to blade hits.

The invention uses, in embodiments, reused wind turbine blades. In contrast with recycling that reintroduces the materials of end-of-life products in the fabrications of new products, reuse conserves the structure of the product while destining it to a different use. In the contest of the invention this includes aerodynamic structures designed for the use in a rotor of a wind turbine that are destined to another use after the original one. This includes in the reused blades also new products that have never been deployed in the application foreseen initially, either because they do not conform to the specification or for another reason. Reuse (also called repurposing) does not require breaking or crushing the original product but may include operations of preparation and transformation such as cutting, painting, drilling, assembling and so on. In the context of the invention, both whole blades and section of blades cut to a desired length can be used, for example.

SHORT DESCRIPTION OF THE DRAWINGS

This disclosure shows examples of realization of the invention illustrated by the drawings in which:

FIG. 1a et 1b show a photovoltaic installation according to the invention installed on a mast of a wind turbine, in an open configuration.

FIG. 2 shows the photovoltaic installation of the invention in a compact configuration.

FIG. 3 shows a photovoltaic module mounted on a wind turbine's blade.

FIG. 4 shows some advantages of the photovoltaic installation of the invention in function on a mast of a wind turbine.

FIG. 7 shows a variant of the invention with an auxiliary support post FIG. 8 shows an alternative arrangement of the photovoltaic module of the invention on a reused blade of a wind turbine.

FIG. 9 shows a possible way of connecting a blade of a horizontal axis wind turbine and the photovoltaic module of the invention.

In the figures, remarkable elements are identified by reference signs that are repeated in the text. The same reference sign is used to identify distinct elements that are identical or functionally equivalent. When many instances of an element are present, they are only in part identified by a sign to avoid overcrowding the figures.

EXAMPLES OF EMBODIMENTS OF THE INVENTION

Figure 1A:
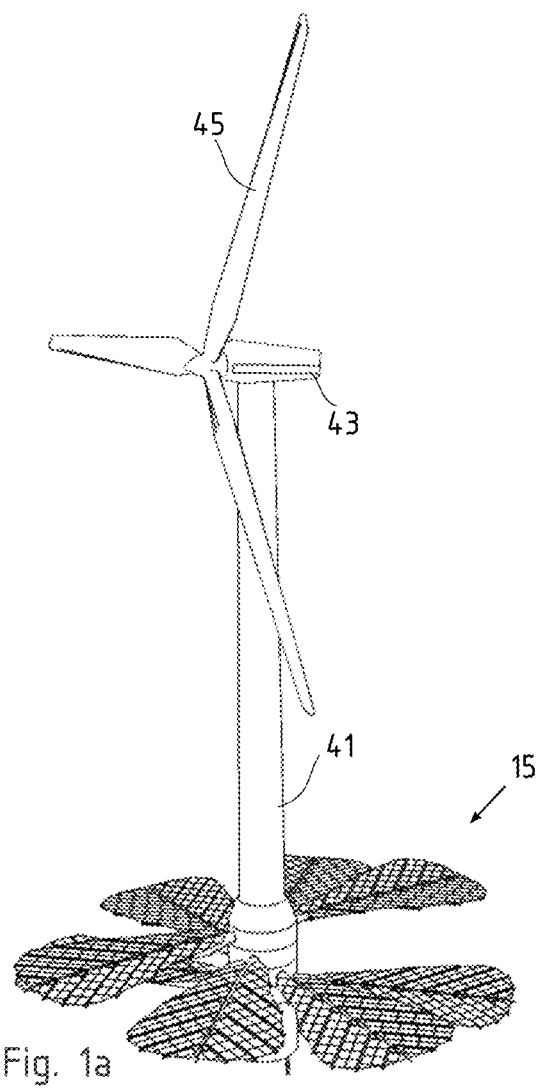

FIG. 1a shows an example of a hybrid site producing energy and comprising a wind turbine and a photovoltaic installation according to the invention. The wind turbine is of the horizontal axis variety with a mast 41 atop of which sits a nacelle 43 that hosts the electric machines needed to convert the kinetic energy of the rotor 45 into electricity. The wind turbine of FIG. 1a is a non-limiting example. The invention could be applied to masts of wind turbines with a different structure, for example double-rotor turbines.

The photovoltaic installation foresees a plurality of modules 16, preferably identical, one whereof is shown by FIG. 3 as example. Each module is carried by a structure ideally constituted by a reused blade of a wind turbine 25, or by a section of a blade of a wind turbine, that is connected cantilever-fashion to the vertical structure 41. Advantageously, blades of wind turbines can withstand very high static and dynamic loads, even after many years of service, and can carry very well a considerable surface of solar panels 18.

In a variant of the invention the solar panels 18 of the modules 16 are flat structures, also called "leaves", as shown by FIG. 3. Solar panels 18 are preferably bifacial to collect, in addition to the direct solar rays, also the light diffused by the ground, the vegetation, and the snow.

FIG. 3 shows modules 16 comprising a single beam 25 each. The invention includes however also variants, not illustrated, with several beams in each module 16. The beams can be placed parallel, in a "V" shape, or any suitable arrangement and can have one or more blades of wind turbine or sections of blades of wind turbines. The blades of wind turbines can contribute also to the constructions of the ribs 26 or of the frame 28.

Even discounting the shadow cast by the mast 41 and the rotor 45, the solar irradiation conditions of the wind turbines are often excellent. The sites of installation of the wind turbines are connected to the power network and usually have an access route, which favours the installation of photovoltaic systems considerably. Moreover, the energy generated by the photovoltaic panels can be used by the wind turbine when there is a calm in the wind, to power service equipment or start the rotor if withdrawing the needed energy from the electric network is not possible or desirable.

The photovoltaic installation can be conceivably also coupled to an energy stockage system, for example an electrolyser to generate hydrogen, pumps to lift water in a suitable reservoir, batteries or any other stockage system. The energy can also be used on site, for example to desalinate sea water.

Figure 1B:
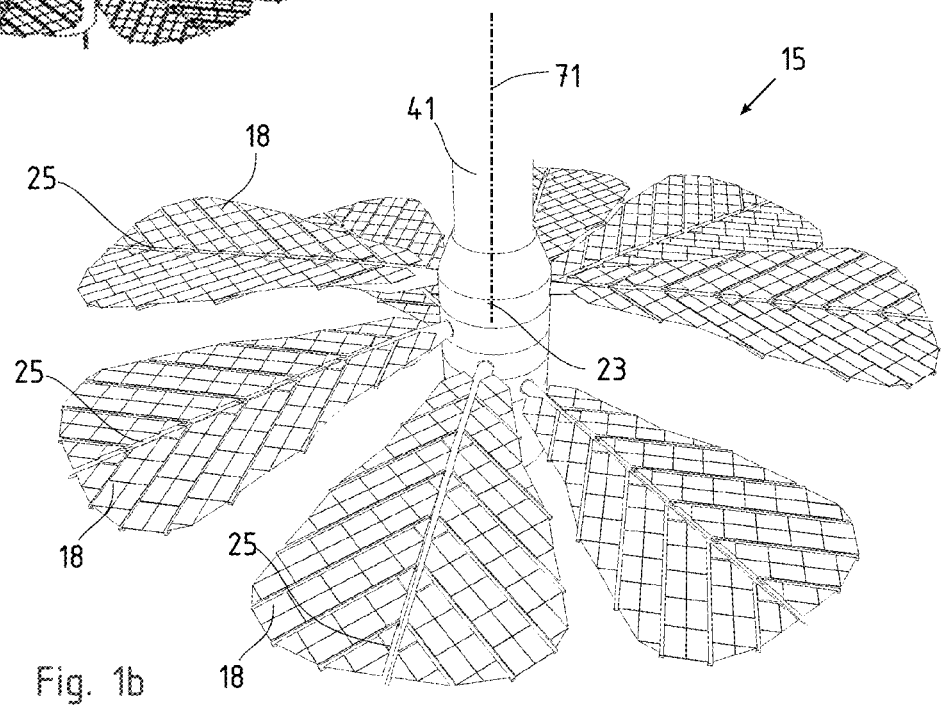

The structure of the photovoltaic "leaf" 16 allows advantageously to fold the modules and/or recuce the photovoltaic surface, as shown in FIGS. 1a, 1b et 2. To this effect, modules 16 are mounted at different levels on supporting collars 23, capable of overlapping each other. The active surface of the installation can then be changed by pivoting the collars about the vertical axis 71 (see FIG. 1b) of mast 41 or of the vertical support structure. FIGS. 1a and 1b show a fully open configuration that maximises the active surface, while FIG. 2 show a possible folded configuration, minimising the windage or the snow cover, for example. Possibly, this folded structure can rest in part on a support post, not shown in the figure, to stand higher loads in this configuration.

Figures show two solar modules on each collar 23. Such an organization is balanced and reduces the height of the structure, but other variants are possible, which leads to a more compact folding, in which each collar carries only one photovoltaic "leaf" 16. One could also imagine variant with two, three, four or more "leaves" 16 per collar.

The motion of collars 23 and modules 16 is provided by electric motors, preferably under remote control, not shown.

The photovoltaic installation of the invention offers many advantages. FIG. 4 shows a hybrid installation according to the invention: panels 18 cover an ample area 50 at the foot the mast 41 that is protected from sunlight, and from frost. It can be used as shaded area for cattle, for horticulture, to protect ski slopes or hiking trails from falls of ice. Solar modules 15 Also provide a considerable attenuation, in a limited zone, of the noise generated by the rotor 45.

In addition, the photovoltaic structure of the invention can be useful also to study the collisions between birds or bats and the turbine's rotor. Such studies are normally difficult and expensive due to the vegetable cover and require regular cuts of the grass at the foot of the mast. Thanks to the invention, the victims of chocs fall on the solar panels (arrow 60) where they can easily be counted and classified visually.

Figure 5:
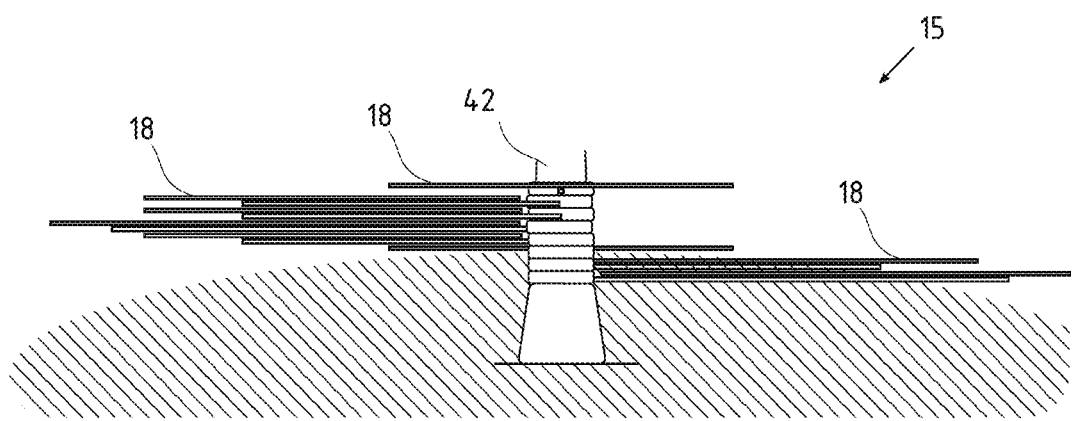
FIG. 5 shows the photovoltaic installation of the invention after the end of life of the associated wind turbine.

At the end of the technical life of the wind turbine, the mast and the electric machines are recycled. Foundations, however, are often left in place, or else only the upper layer of the foundations are dismantled. A stump 42 of mast could advantageously be preserved to carry the photovoltaic installation and continue the production of electricity, as seen in FIG. 5.

Figure 6:
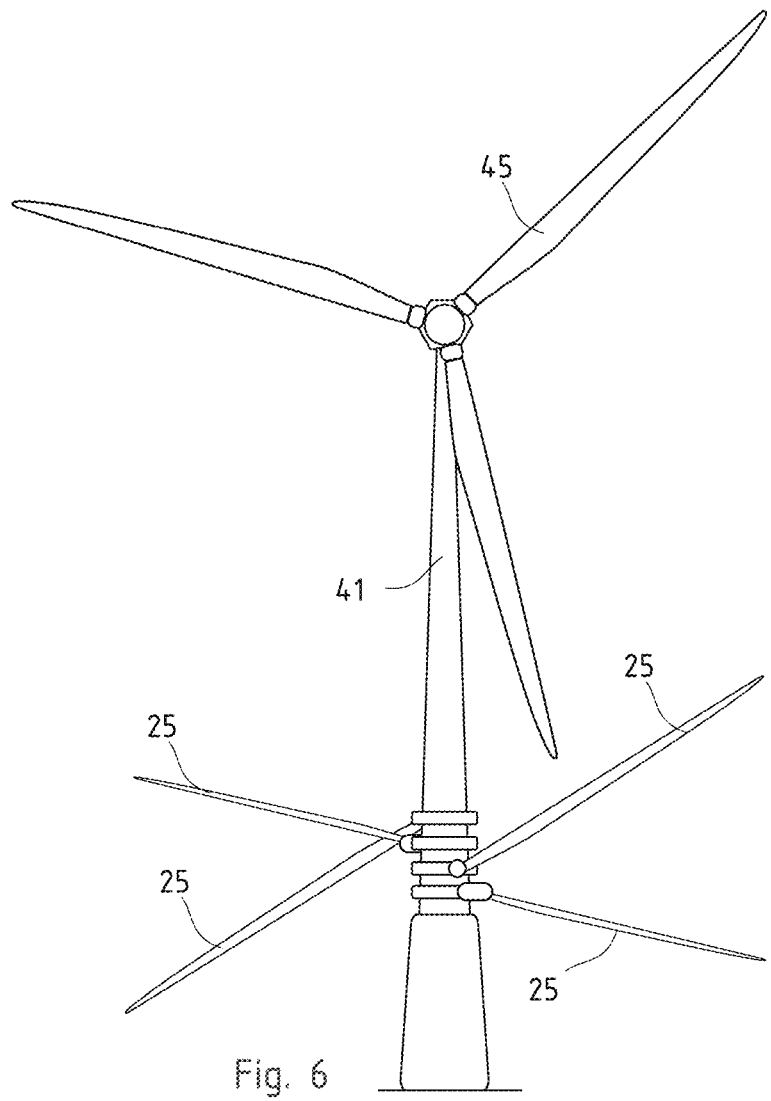
FIG. 6 shows a variant of the invention.

The movement of the photovoltaic modules is not limited to a pivoting about the vertical axis. In conceivable variants, the photovoltaic modules can be inclined with respect the horizontal as shown in FIG. 6. To simplify the drawing, FIG. 6 shows only four blades 25 without the covering of photovoltaic panels 18. In this example the photovoltaic modules turn about an axis 73 (see FIG. 3) orthogonal to the longitudinal axis of the blades 25, but in possible variants the photovoltaic modules could also pivot on the longitudinal axis 72 of the blades 25.

A possible variant of the invention foresees the installation of the photovoltaic modules on a mast of a wind turbine as disclosed above, on beams on any nature, if blades of a wind turbine having the desired properties are not available. Preferably the beams are made of metal, wood, or a material that is recyclable or reusable.

FIG. 7 shows a variant of the invention with an off-centre post that provide a secondary support to the folded configuration. The installation has eight superposed photovoltaic modules 16, each with a reused blade of a wind turbine 25 that makes a horizontal beam. It shall be understood that these numbers are not essential features, and that the installation could have more modules, or less. The upper collar 24 is fixed and the topmost photovoltaic module rests by all the time on the collar 24 which is attached to the mast 41 on one end and on the secondary post 48 at the other end opposed. The secondary post 48 is preferably placed downwind of the mast 41 considering the direction of the prevalent wind, in a position that does not interfere with the operation and with the maintenance of the wind turbine.

When the collars support only one photovoltaic module, as shown, a counterweight 21 can be provided in a diametrically opposed position to the root of the blade 25 to balance each level. That is not essential, however: the collars could carry each two or more modules and in some cases the counterweight could be dispensed with.

Collars 23 below collar 24 can turn about the vertical axis of the mast 41 and have each a photovoltaic module 16. The beams 25 are reused blades of horizontal axis wind turbines, and each blade 25 is fixed on a collar 24, for example by the root fixture already existing, foreseen initially to mount the blade on the hub of the wind turbine.

The photovoltaic modules carried by the collars 23 can take the folded configuration as shown in the figure, with all the modules overlapping and covered by the uppermost immovable module, as well as an open configuration in which the photovoltaic modules are regularly spaced to maximise the light collection. Preferably, in the folded configuration shown, the photovoltaic module rest on the secondary support 48, as well as being held by the mast 41. This can be obtained by rests regularly spaced on the secondary post, or by any other suitable means.

The motion of the turning collars 23 can be obtained in many ways. A favourable solution consists in driving the lowermost collar with a motor-reducer group 83 sweeping an angle of 315°, wherein the lowermost collar drives in succession the upper collars by progressively diminishing arcs of 270°, 225°, 180°, 135°, 90°, 45°, which provides a regular distribution with eight modules at equal angles. Stops (not visible) are foreseen to transmit the rotation of a collar to the collar immediately above along the desired sectors of angle. Nevertheless, there are other possible solutions. It may be possible and advantageous to reuse the electric motors used for the yaw of the nacelles of the wind turbine to drive the solar installation of the invention, since the performances needed in both applications are not dissimilar.

The space between the lowermost collar and the ground level can be protected by a shelter 80 that defines a technical and maintenance room for the electric and mechanic machines needed to the good operation of the solar installation. This shelter may protect the inverters required to transfer the photovoltaic power on an AC network, as well as the motor 83.

FIG. 8 shows an arrangement of the photovoltaic panel in a photovoltaic module that is alternative to that of the FIG. 3. In this variant, the blade 25 has many horizontal crosspieces 26 that cross the blate at right angle and are regularly spaced on its length. Each crosspiece 26 is fixed on the blade 25, for example by structures 27 that claim the blade 25 resting on its upper face and on its lower face, as represented in FIG. 9. The crosspieces extend symmetrically on both sides of the blade 25. The clamping geometry is designed having regard to the internal structure of the blade of the wind turbine 25, especially in consideration of the position of the internal reinforcements (shown summarily in section).

Each crosspiece is equipped by a double row of photovoltaic panels 18. Advantageously, the crosspieces are independent one form the other and can follow the unavoidable flexions of the blade 25 without transmitting dangerous stresses to the panels 18.

Figure 10:
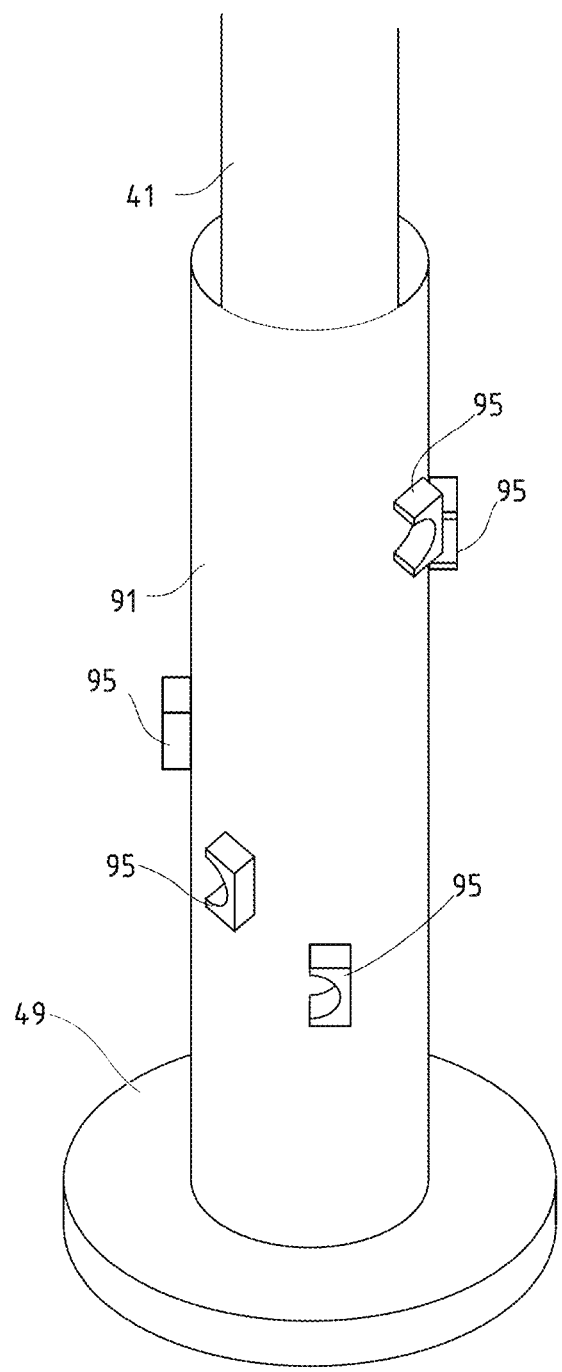
FIG. 10 shows an example of the invention with a shell surrounding the mast of a wind turbine to support the photovoltaic modules.

FIG. 10 shows schematically a variant of the invention in which a mast 41 of a horizontal axis wind turbine is girdled by a shell 91. The shell 91 is placed around the mast 41 before the mounting of the collars 23 and of the photovoltaic modules 16, such that the collars 23 are supported by the shell 91 rather than immediately by the mast 41. Advantageously, the shell does not follow the movements of flexion and oscillation of the mast 41. To insulate mechanically the shell 61 from the mast 41, the former is preferably connected to the mast only at the bottom end or affixed directly on the foundation basement 49 without direct contact with the mast 41.

Advantageously, when the wind turbine reaches the end of its useful life, the mast 41 can be dismounted completely and recycled, while the photovoltaic installation remains in place, on the shell 91.

All the variants of the invention disclosed herein can be equipped of a shell as hereby illustrated, with the advantage, among others, of a more precise rotation of the photovoltaic modules in situation of violent wind. The shell 91 or, in its absence, the mast 41, can have notches 95 defining the position of the photovoltaic modules in the open configuration.

REFERENCE NUMBERS USED IN THE DRAWINGS 15 photovoltaic installation
16 photovoltaic module
18 photovoltaic panels
21 counterweight
23 pivotable collar
24 fixed collar
25 reused blade of wind turbine, beam
26 rib
27 clamping means
28 frame
41 mast
42 vertical structure, stump of a mast
43 nacelle
45 blade of wind turbine in service, rotor
48 support post
49 foundation basement
50 protected zone
60 fall
71 vertical axis
72 longitudinal beam's axis
73 transversal beam's axis
80 shelter
83 motor
91 shell
95 notches

The invention claimed is:

1. A Photovoltaic installation comprising a vertical structure, and a plurality of photovoltaic modules, each photovoltaic module of the plurality of photovoltaic modules comprising a collar connected to the vertical structure pivotably around a vertical axis of the vertical structure, a repurposed wind-turbine blade from a horizontal-axis wind turbine acting as a cantilever beam attached to the collar at one end and carrying a plurality of photovoltaic panels.

2. The photovoltaic installation of claim 1, wherein the vertical structure is a mast of a horizontal-axis wind turbine, or a stump of a mast of a horizontal-axis wind turbine not in service, or a vertical structure surrounding a mast of a horizontal-axis wind turbine, and wherein the vertical structure rests on a foundation basement of the horizontal-axis wind turbine.

3. The photovoltaic installation of claim 1, wherein the cantilever beam of the respective photovoltaic modules are affixed at several heights around the vertical structure so as to allow an open configuration, in which the photovoltaic modules are distributed around the vertical structure and a folded configuration in which the photovoltaic modules are vertically aligned and superposed presenting a higher resistance to loads induced by snow and wind.

4. The photovoltaic installation of claim 3, including a secondary support post supporting the installation in the folded configuration.

5. The photovoltaic installation of claim 4, comprising an upper photovoltaic module not pivotable with a beam that has one extremity resting on the vertical structure and a second extremity resting on the secondary support post.

6. The photovoltaic installation of claim 5, wherein the photovoltaic modules rest on the secondary support post in the folded configuration.

7. The photovoltaic installation of claim 1, wherein the photovoltaic panels of each photovoltaic module are arranged in a plane.

8. The photovoltaic installation of claim 1, wherein the cantilever beam is inclinable with respect to the horizontal by pivoting around a horizontal axis.

9. The photovoltaic installation of claim 1, wherein the photovoltaic panels are bifacial.

10. The photovoltaic installation of claim 1, each photovoltaic module comprising a plurality of horizontal crosspieces affixed on the respective cantilever beam by their middle at right angle, each crosspiece carrying a double row of horizontal photovoltaic panels, each crosspiece having in its middle a clamping structure configured to clamp vertically on the wind-turbine blade.

* * * * *